United States Patent [19]

Puskas

[11] 3,736,523

[45] May 29, 1973

[54] FAILURE DETECTION CIRCUIT FOR ULTRASONIC APPARATUS

[75] Inventor: William L. Puskas, Trumbull, Conn.

[73] Assignee: Branson Instruments, Incorporated, Stamford, Conn.

[22] Filed: July 31, 1972

[21] Appl. No.: 276,559

[52] U.S. Cl. ....................331/64, 259/1 R, 310/8.1, 331/77, 331/116 R, 331/162

[51] Int. Cl. ....................H01v 7/00

[58] Field of Search ....................331/64, 77, 116 R, 331/162; 310/8.1; 259/1 R, DIG. 44

[56] References Cited

UNITED STATES PATENTS

| | | | |
|---|---|---|---|
| 2,724,107 | 11/1955 | Born | 331/64 X |
| 3,581,125 | 5/1971 | Arndt | 331/116 R X |
| 3,681,626 | 8/1972 | Puskas | 310/8.1 |

*Primary Examiner*—Roy Lake
*Assistant Examiner*—Siegfried H. Grimm
*Attorney*—Ervin B. Steinberg

[57] ABSTRACT

A failure detection circuit for a power oscillator driven by a set of transistors which are switched to provide a square wave drive voltage to the oscillator comprises a narrow band pass filter and a voltage sensitive means. The band pass filter is coupled for receiving the square wave voltage and permits the passage of a predetermined odd-harmonic signal to the voltage sensitive means. The amplitude appearing at the voltage sensitive means, such as a lamp, is indicative of the operation of the oscillator.

10 Claims, 6 Drawing Figures

FAILURE DETECTION CIRCUIT FOR ULTRASONIC APPARATUS

BACKGROUND OF THE INVENTION

This invention relates to a relatively simple and inexpensive circuit for detecting failure in a system comprising an electronic power oscillator and a resonant load. More specifically, the present invention concerns an ultrasonic power system wherein an oscillatory circuit drives one or more electromechanical transducers. Typical of such a system is an ultrasonic cleaning installation comprising an electronic power circuit which is coupled to electromechanical transducers operating at their resonant frequency, generally at a frequency in the range between 16 and 100 kHz.

In the past many attempts have been made to provide a simple and reliable detection scheme which will detect a failure of the electrical or mechanical components of such a system. None of these prior schemes have been found entirely satisfactory since they either are more complex than desired or failure detection is unreliable.

Additional problems present themselves in modern oscillatory systems which make use of oscillator power modules that are connected in parallel for providing increased power to the resonant load, as shown for instance in copending application for U.S. Letters Patent Ser. No. 113,464 filed Feb. 8, 1971, entitled "Power Supply for Energizing Electro-Acoustic Transducer Means". When using a modular arrangement it is desirable, of course, to provide a failure detection circuit which detects the failure of any one of the paralleled oscillators, indicates which oscillator has failed and also provides a reliable indication in the event of a loss of any one or all of the load components, such as may be caused by conductor breakage, a short circuit, and the like.

SUMMARY OF THE INVENTION

The present invention comprises a narrow band pass filter constructed for passing an odd harmonic signal of the fundamental frequency and a voltage sensitive means connected for receiving the signal passed by the filter. The filter receives at its input a substantially square wave drive voltage signal from the power oscillator, such square wave voltage signal being present in practically all modern power oscillators using transistors since any transistorized power oscillator which does not switch the transistors from saturation to cutoff in a square wave fashion fails to provide the high efficiency achievable with such circuits.

The odd harmonic narrow band pass filter, as will be shown hereinafter, is extremely sensitive to a change in operating conditions of the oscillatory system, for instance the absence of proper input voltage or a change in the reactive load components, and such a change will reflect itself as a decrease in output voltage provided by the filter to the voltage sensitive means.

As used herein "odd harmonic" shall be defined as the fundamental frequency signal ($f_o$) multiplied by an odd integer.

Further and other important features of the present invention will be more clearly apparent by reference to the following description when taken in conjunction with the accompanying drawing.

DETAILED DESCRIPTION OF THE INVENTION

Figure 1:
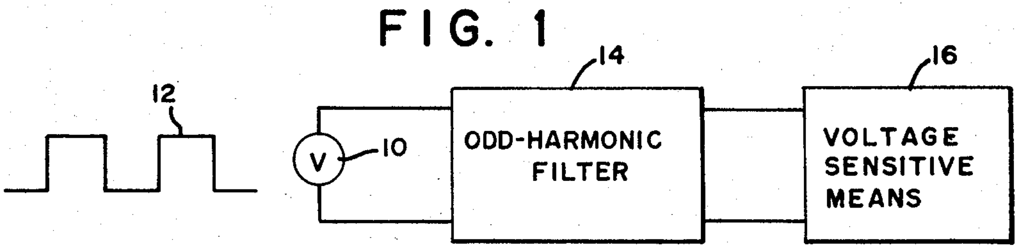
FIG. 1 is a schematic block diagram of the invention.

Referring now to the figures and FIG. 1 in particular, a voltage source 10, such as a transistorized switching circuit, provides a substantially square wave signal 12 to an odd harmonic narrow band pass filter 14 whose output is coupled to a voltage sensitive means 16 for indicating the condition when the signal provided by the filter 14 fails to attain a predetermined amplitude. The voltage sensitive means may comprise for instance an incandescent lamp, a relay, a meter, or an electronic trigger switch indicating the condition when the output signal falls below a predetermined level.

Figure 2:
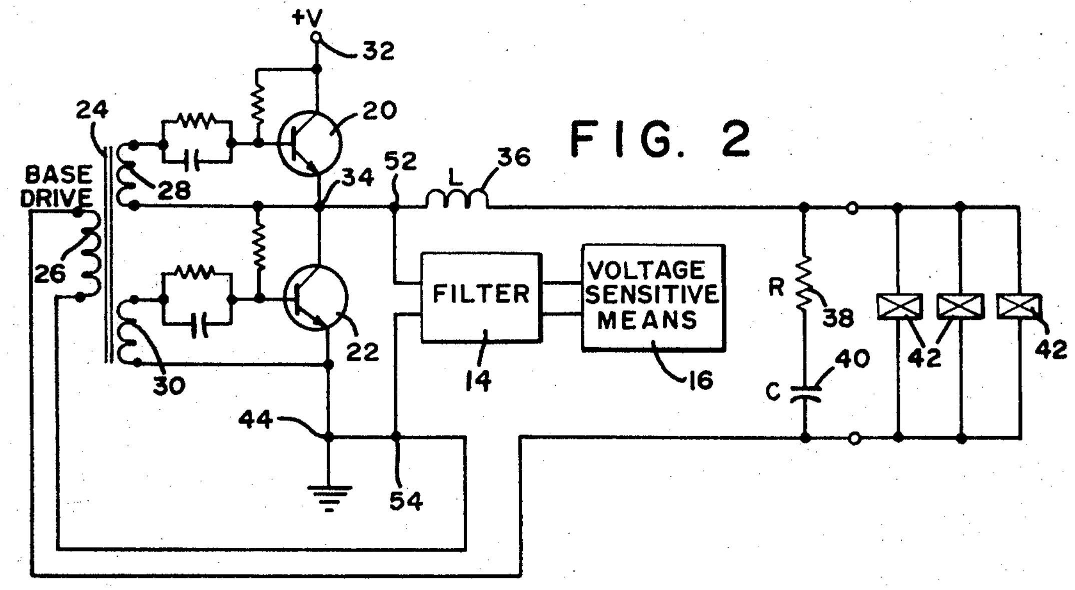
FIG. 2 is a schematic electrical circuit diagram of the invention used in an ultrasonic circuit.
Figure 5:
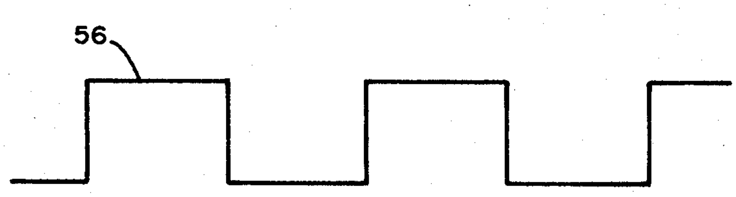
FIG. 5 is an illustration of the wave shape of the signal applied to the filter.
Figure 6:
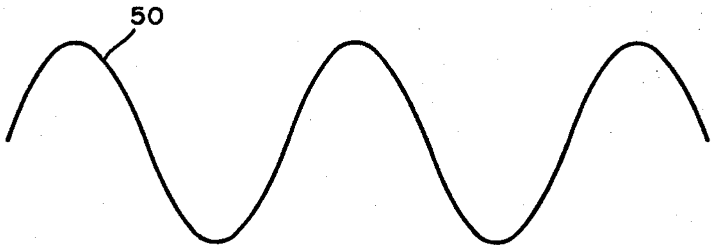
FIG. 6 is an illustration of the wave shape of the current provided by the oscillator to the load.

FIG. 2 illustrates the connection of the failure detection circuit to a power oscillator which is energized by a transistor voltage half bridge. The oscillatory circuit is designed for driving a plurality of ultrasonic transducers. The driving portion of the oscillatory circuit comprises a pair of series connected switching transistors 20 and 22 which are controlled by a feedback transformer 24 having a primary winding 26, a pair of secondary windings 28 and 30, and the usual feedback and bias components. During a first half cycle the transistor 20 is rendered conductive by the signal applied from the winding 28 via the bias network to the base and emitter electrodes. Hence, current will flow from the positive terminal 32 through the transistor 20 to the junction point 34, through the oscillatory circuit comprising a series inductance 36, the series connection of resistance 38 and blocking capacitor 40 and one or more electromechanical transducers 42 coupled in parallel with the resistance and capacitor, the primary winding 26 of the feedback transformer 24 to the negative terminal 44. During the next half cycle current conduction through the transistor 20 is blocked and the transistor 22 is rendered conductive via the winding 30 to cause current flow from the junction point 34 through the transistor 22, the primary winding 26 of the feedback transformer 24 through the capacitance 40 and series resistance 38 and transducers 42 in parallel, and through the inductance 36. This action causes an alternating current of sinusoidal wave shape 50, see FIG. 6, to flow in the load circuit represented by the inductance 36, capacitor 40 and transducers 42. The filter 14 is connected with its input across the terminals 52 and 54 and receives a substantially square wave voltage signal 56, FIG. 5, responsive to the switching action of the transistors 20 and 22.

The above described high-efficiency transistor switching circuit switching the transistors between cutoff and saturation is described more fully in an article "Frequency and Power Limitations of Class-D Transistor Amplifiers," by W.J. Chudobiak et al., IEEE Journal of Solid State Circuits, February 1969. Transducers 42 typically are piezoelectric devices as shown in U.S. Pat. No. 3,066,232 issued to N.G. Branson, entitled "Ultrasonic Transducer", dated Nov. 27, 1962 and designed to operate at a predetermined frequency in the range from 16 to 60 kHz for imparting ultrasonic energy to a liquid bath responsive to the applied high frequency electrical energy.

Figure 3:
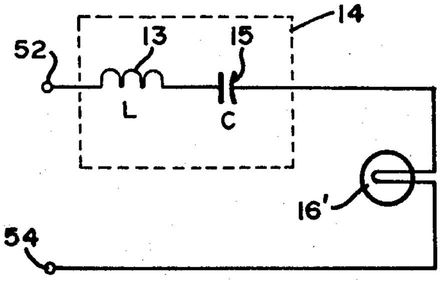
FIG. 3 is a schematic electrical circuit diagram of the failure detection circuit comprising a filter and a voltage sensitive means coupled thereto.
Figure 4:
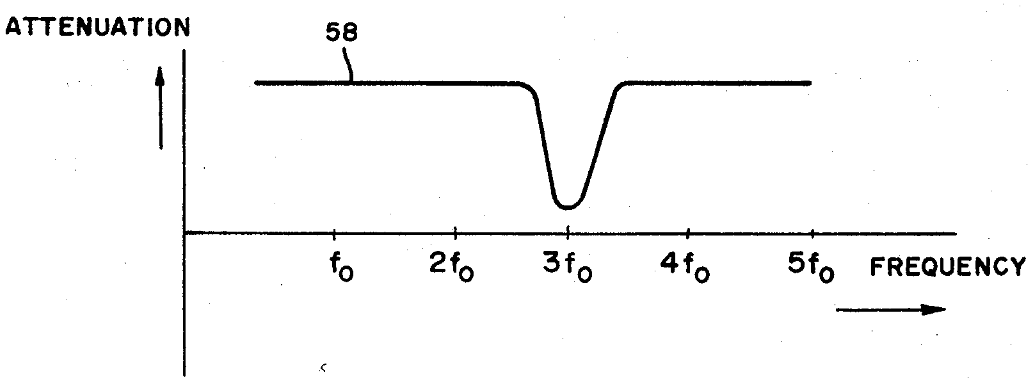
FIG. 4 is a graph illustrating the behavior of the filter.

FIG. 3 shows a preferred embodiment of the filter 14 comprising the series connection of an inductance 13 and capacitance 15 coupled to a voltage responsive element, such as an incandescent lamp 16'. The filter is designed to operate as a narrow band pass filter, curve 58 FIG. 4, providing attenuation to all signals except to the third harmonic $3f_o$ which is the signal having a frequency equal to three times the fundamental frequency. It shall be understood that the filter may be designed to exhibit a narrow band pass characteristic at other odd frequencies, such as at $5f_o$ or $7f_o$ for example.

For the purpose of the following discussion it is assumed that the narrow band pass filter 14 is designed for passing the third harmonic and that an incandescent lamp is used for the voltage sensitive means. It will be apparent that the analysis would be similar for another odd harmonic filter or for a meter, relay coil, electronic trigger circuit or any other voltage sensitive means.

The Fourier Series for a square wave signal with a period 2L and unity amplitude is:

$$f(x)=\frac{4}{\pi}\sum_{n=1,3,5}\frac{1}{n}\sin\frac{n\pi x}{L}$$

wherein L is one-half period of the square wave signal and $x$ is one axis in the Cartesian coordinate system. The equation above indicates that the square wave signal is made up of sinusoidal waves with frequencies which are odd multiples of the fundamental frequency, that is, odd harmonics. The third harmonic has an amplitude equal to $4/3\pi$. It is the sinusoidal signal $4/3\pi \sin 6\pi f_o x$ which is transmitted by the filter and causes actuation of the lamp 16'.

If the oscillator circuit should fail, that is, stop oscillating or decrease in amplitude, there no longer exists the $4/3\pi$ voltage sine wave amplitude, hence causing a darkening of the lamp filament. If part of the reactive load should be lost, for instance by a conductor breakage on one of several paralleled transducers 42, then the fundamental frequency changes. The third harmonic changes by three times the change in the fundamental frequency and as a consequence thereof, no frequency component is left which is passed by the filter. Therefore, the lamp will be extinguished also.

The above described detection circuit has many advantages over the heretofore known similar systems which use separate circuits to detect amplitude, high frequency and low frequency changes. The greater complexity of the prior art circuits plus the need for three separate detection channels increases the cost of older systems by at least one order of magnitude over the novel system described heretofore. Whereas some prior circuits have made use of relatively inexpensive detection circuits which considered only the voltage of the fundamental frequency, such prior arrangement is easily deceived when power modules are operated in parallel. If in the latter case one of the paralleled oscillators fails, the fundamental frequency appearing at the output of properly operating oscillators is fed back into the output of a defective oscillator and this fed back oscillator then provides an erroneous indication to the prior detection circuit. In contrast therewith, the odd harmonic filter never passes a fundamental frequency signal which is fed back. Hence the above described failure detection circuit is responsive only to the operation of the oscillator module with which it is associated.

When using a relay for the voltage sensitive means the relay coil will be suitably dimensioned to operate contacts at a predetermined voltage level to indicate the condition of proper or insufficient voltage amplitude from the filter. If a meter is used it may include contact means to initiate a suitable control circuit to signify either proper or improper circuit condition. Electronic triggering means may be used in an analogous manner.

It will be apparent that the above described failure detection system used in conjunction with an ultrasonic apparatus provides a most reliable and simple arrangement for monitoring the proper operating condition of such an apparatus and that the detection scheme constitutes a significant advance in the art.

What is claimed is:

1. In an ultrasonic circuit the combination of:
a source for providing a substantially square wave voltage signal to an oscillatory circuit;
a filter coupled for receiving said signal and providing attentuation to substantially all signals except to an odd harmonic frequency of said square wave voltage signal; and
voltage sensitive means coupled to said filter for receiving the signal passed by said filter whereby the condition of said voltage sensitive means is indicative of the operation of said source and oscillatory circuit.

2. In an ultrasonic circuit as set forth in claim 1, said source providing a signal for driving said oscillatory circuit at a frequency of at least 16 kHz.

3. In an ultrasonic circuit as set forth in claim 1, said filter being a narrow band pass filter designed for passing a signal having a frequency three times the fundamental frequency at which said oscillatory circuit is operating.

4. In an ultrasonic circuit as set forth in claim 1, said filter being a narrow band pass filter comprising the series connection of an inductance and a capacitance.

5. In an ultrasonic circuit as set forth in claim 1, said voltage sensitive means comprising a lamp.

6. In an ultrasonic circuit as set forth in claim 1, said voltage sensitive means comprising an electrical relay.

7. In an ultrasonic circuit as set forth in claim 1, said voltage sensitive means comprising an electronic circuit.

8. In an ultrasonic circuit as set forth in claim 1, said source providing substantially square wave voltage signals comprising the series connection of two transistors coupled across a source of direct current potential, and an oscillatory load circuit coupled to a junction between said transistors and one pole of said source of direct current potential.

9. In an ultrasonic circuit as set forth in claim 8, said oscillatory load circuit including at least one electromechanical transducer adapted to receive electrical energy at an ultrasonic frequency and provide in response thereto high frequency mechanical vibrations.

10. In an ultrasonic circuit the combination of:
a source of direct current;

a pair of serially connected switching transistors coupled to the poles of said source;

an oscillatory circuit coupled to a midpoint between said serially connected transistors and one of said poles;

means coupled for causing said transistors to be rendered alternatingly conductive to drive said oscillatory circuit whereby said transistors are switched in a manner to apply a substantially square wave voltage signal to said oscillatory circuit;

a filter coupled for receiving said square wave voltage signal and designed for providing attentuation to substantially all signals except to a selected odd harmonic frequency of said square wave voltage signal, and voltage sensitive means coupled to said filter for receiving the signal passed by said filter and indicating when the signal passed fails to attain a predetermined amplitude.

* * * * *